Jan. 3, 1933.    A. HALLERMANN    1,893,411
PROCESS AND APPARATUS FOR CLARIFYING OR SEPARATING THE HEAD FROM THE
FERMENTING LIQUOR IN BREWING OR IN OTHER FERMENTATION PROCESSES
Filed Feb. 7, 1931
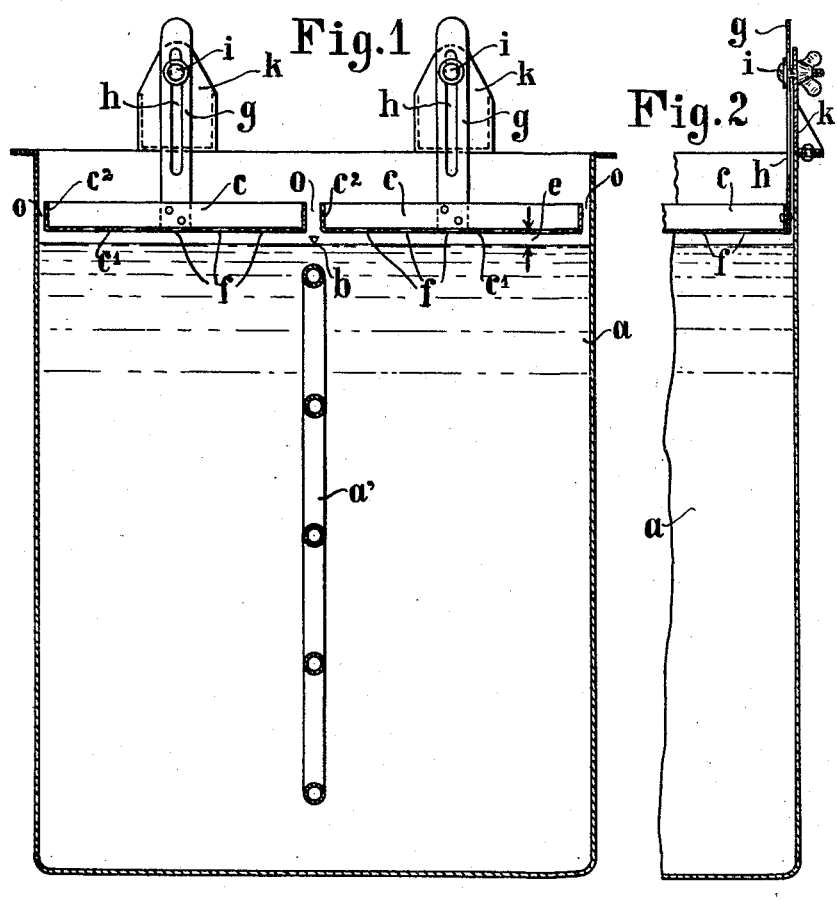
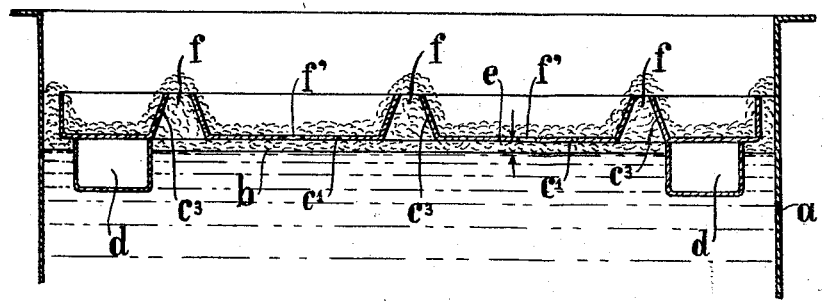
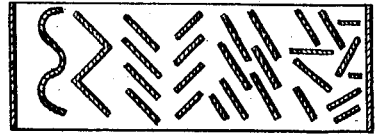

Patented Jan. 3, 1933

1,893,411

UNITED STATES PATENT OFFICE

ADOLF HALLERMANN, OF MUNSTER, GERMANY

PROCESS AND APPARATUS FOR CLARIFYING OR SEPARATING THE HEAD FROM THE FERMENTING LIQUOR IN BREWING OR IN OTHER FERMENTATION PROCESSES

Application filed February 7, 1931, Serial No. 514,283, and in Germany February 24, 1930.

The subject matter of the invention is a process and apparatus for clarifying or separating the head from the fermenting liquor in brewing or also in other fermentation processes.

Hitherto in the fermenting room of the brewery, and in the case also of other fermentations, it has been usual to allow the heads to develop quietly. The different stages of the development of the head are recognized, and among these in particular is the stage of the development of the rocky head during the fermentation. This rocky head falls after a fermentation lasting several days to a so-called fermentation or yeasty head or layer. This yeasty head has hitherto been removed before racking (drawing off the liquor) owing to the gally bitterness of its taste, in order that it might not be transferred into the storage vessel and there impart a still more bitter taste to the beer. The bitter gally constituents of the yeasty head contract on their surface during the stage of the rocky head to form brown clots or lumps while there is a strong separation of liquid. These brown clots or lumps, owing to their weight, fall during the main fermentation process through the snow-white, less solid and deeper lying head and are deposited on the surface of the fermenting liquor as fairly solid floating lumps and so come into intimate contact with the liquor. This contact of the fermenting liquor with the material of the yeasty head which has previously been driven out of the fermenting liquid owing to the fermentation leads to a partial solution again of the material in the fermenting liquor. Consequently the beer which is ready for racking becomes more or less gally and bitter. Only by storing the beer for a time can this disadvantage be overcome to a certain extent and the gally bitter effect of this constituent of the head on the taste of the beer reduced.

According to the invention these disadvantages are substantially avoided by allowing the rising head to pass through catching or skimming devices arranged closely above the surface of the liquor, so that on the subsequent collapse or fall of the head the solid constituents remain adhering in the form of a thick brown covering to the skimming devices and are thereby held away from the fermenting liquor.

In this way an entirely automatic separation or clarification of the head is obtained and the formation of a covering or yeasty head which is deposited on the liquor and the harmful effect thereof on the beer is avoided, so that the latter has a more agreeable and purer taste, namely the taste of hops.

The catching or skimming devices for clarifying the head and for retaining the material containing the bitter principle may advantageously consist of a sheet metal plate which is provided with apertures for the passage of the head and is secured at a predetermined distance above the surface of the liquor by means of a suitable adjustable securing device or by means of floats. For this purpose it is recommended to provide the opening for the passage of the rising head with a raised edge and to make it narrower towards the top, and to provide still smaller openings at the lowest part of the skimming plate for the passage of the liquid which separates on the collapse of the head.

Different constructional forms of apparatus for carrying out the new process are illustrated by way of example in the drawing, in which Fig. 1 is a vertical cross-section through a fermenting vat with skimming plates for clarifying the head which are adjustable as to height, Fig. 2 a side view of the device for securing the skimming plates in vertical section, Fig. 3 is a form of the skimming device which is floatable, and Fig. 4 represents further possible forms of the skimming device.

Referring to the drawing, in the example illustrated in Fig. 1 $a$ is the fermenting vat and $a'$ are cooling coils which are arranged therein in the usual manner. At distances $e$ of about 10 mm. above the surface $b$ of the liquid there are arranged two skimming devices $c$ each of which consists of a sheet metal plate $c^1$ with bent-up edges $c^2$ and is provided with a plurality of holes $f$ for the passage of the head and for the return flow of the separating liquid. The sheet metal plates $c^1$ $c^1$ are provided at two opposite edges with side pieces $g$ and are secured so that they are capable of adjustment as to height to a bracket $k$ fitted on the side of the vat by means of a bolt $i$ passing through a slot $h$. Between the bent-up edges $c^2$ of the two adjacent skimming plates $c$ as well as between the outer edges $c^2$ and the wall of the vat there is provided a free space of several centimetres, for example of from 3–5 cm. The method of operation of this device is substantially as follows.

During the fermentation the rising heads pass in part through the holes $f$ and in part between the edges $o$ and the wall of the vat over onto the skimming plate, where they contract beside the holes $f$ and thereby deposit the brown constituents of the head on the free parts of the plate. In the apertures $f$ there is a fairly vigorous upward action so that neither the head nor the solid constituents but only the parts of the fermenting liquor separating from the head on the collapse of the latter flow back by this way into the container, while the bitter principle in the form of a thick brown layer remains adhering to the upper side of the sheet metal plate and is thereby separated. In this way there is formed on the plate a brown layer which is similar to that which could previously be observed on the side walls of the vat above the surface of the liquid.

In order to facilitate the rising of the head and the catching or skimming of the same, the apertures $f$ for the passage of the head may, as illustrated in Fig. 3, advantageously be made wider, and may be formed by pressing apertures $c^3$ in the shape approximately of truncated cones out of the bottom $c'$ of the plate, while at the deeper parts of the plate small apertures $f'$ are provided for the return flow of the liquid which separates. Further, in the form of construction according to Fig. 3 separate means of suspension for the skimming plate are avoided and are replaced by floats $d$ which are welded on and which automatically keep the catching or skimming plate at the right distance above the surface of the liquid.

The construction of the catching or skimming plate is of course not limited to that of the two above-described examples, but numerous other forms of construction are possible. Thus, for example there could be provided in a frame, as is illustrated in Fig. 4, a number of more or less oblique or wavy strips of metal or also of sheet metal rings which offer a sufficiently large surface to the head passing between them to enable the solid constituents to be deposited while the freed liquid can return into the container.

The economy and technical advance of this apparatus lies on the one hand in the fact that the formation of any yeasty head or covering on the surface of the fermenting liquor is prevented and so any influence on the taste of the fermenting liquor by the gally-bitter material is eliminated. Consequently beers which have been treated in this way in the fermenting room require a shorter period of storage in which to acquire a fine taste than when they have been fermented in the manner usual at the present time. On the other hand, if this method be employed, many particles of dirt which would otherwise have fallen back into the vat and contaminate the yeast settling at the bottom are caught as well with the clarification of the head. Consequently there is also obtained by the new process a yeast which is considerably purer and therefore more valuable than was the case with the former process. Each of these features represents an important economical advance.

I claim:—

1. The combination with a fermenting tank arranged to hold liquid for fermenting at a predetermined level; of a tray having an upstanding rim and openings in its bottom held in said tank slightly above the normal liquid level, said openings each being surrounded by a frusto-conical wall forming upwardly projecting nozzles, said tray having small openings between the nozzles.

2. The combination with a fermenting tank arranged to hold liquid; of a tray having an upstanding rim and openings in its bottom, and means to hold said tray in slightly spaced relation above the liquid in the tank, said openings each being surrounded by a frusto-conical wall forming upwardly projecting nozzles, said tray having small openings between the nozzles.

3. The combination with a fermenting tank arranged to hold liquid for fermenting; of a tray having an upstanding rim and openings in its bottom, and floats beneath the tray arranged to float the tray in spaced relation above the liquid in the tank, said openings each being surrounded by a frusto-conical wall forming upwardly projecting nozzles, said tray having small openings between the nozzles.

In testimony whereof I affix my signature.

ADOLF HALLERMANN.